May 7, 1963     D. L. HORROCKS ETAL     3,088,773
SEATS, CHAIRS, CHAIRBACKS AND THE LIKE
Filed May 31, 1961     6 Sheets-Sheet 1

INVENTORS
David L. Horrocks
Robert G. Trenchard

Watson, Cole, Grindle & Watson
ATTORNEYS

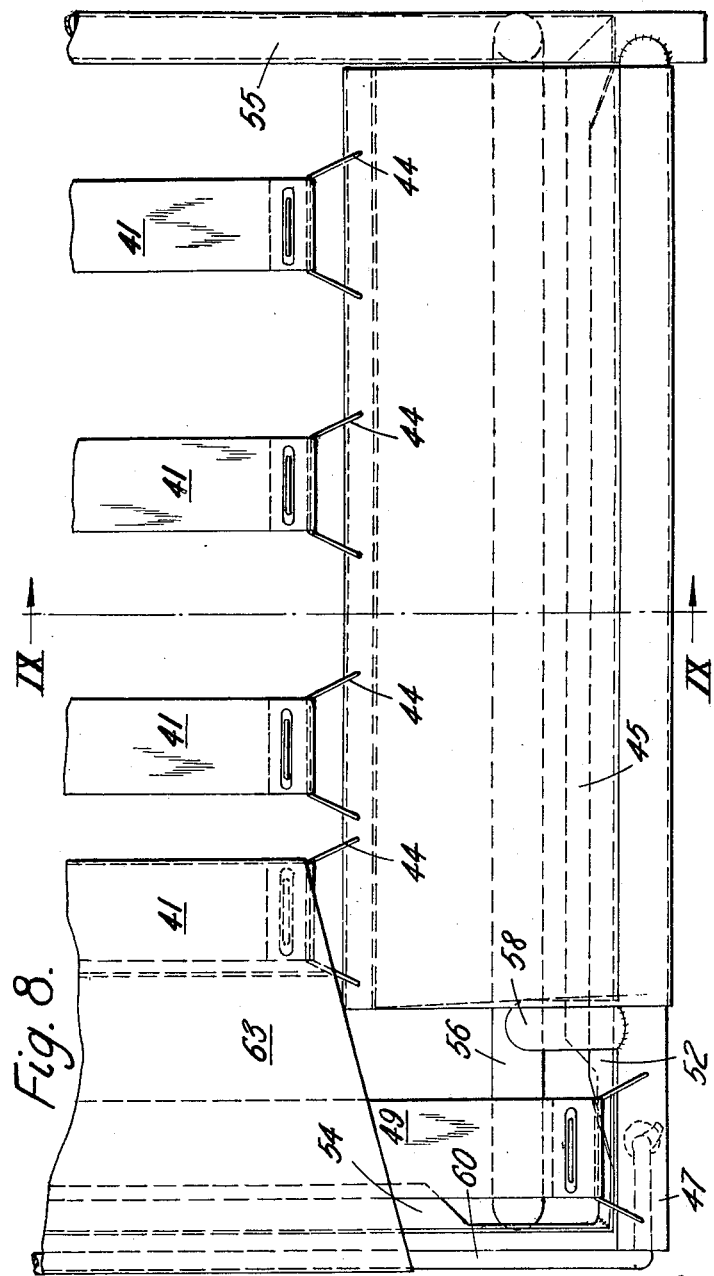

May 7, 1963    D. L. HORROCKS ETAL    3,088,773
SEATS, CHAIRS, CHAIRBACKS AND THE LIKE
Filed May 31, 1961    6 Sheets-Sheet 4
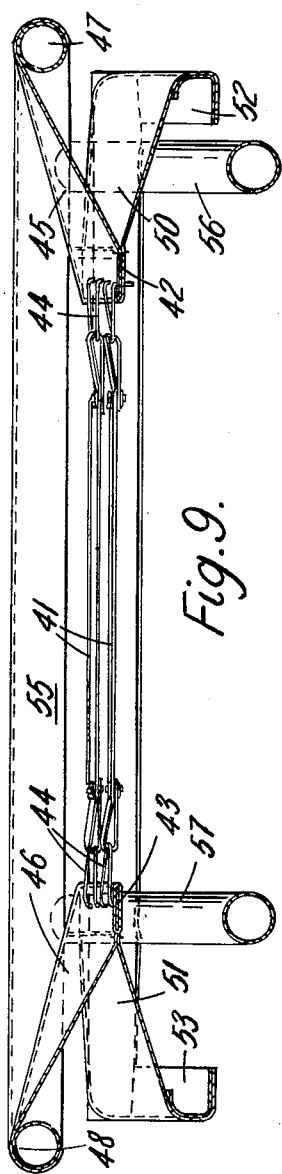
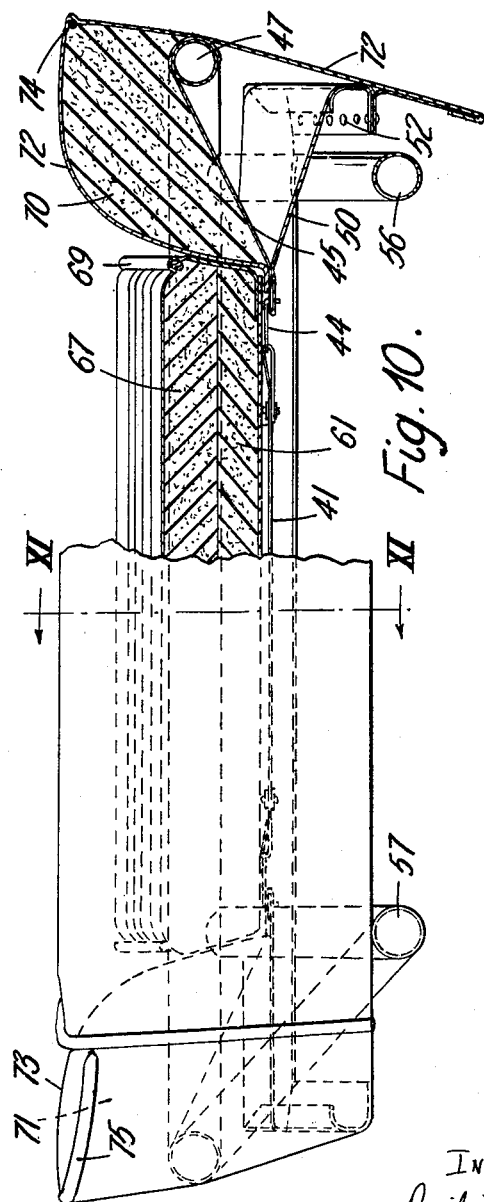
INVENTORS
David L. Horrocks
Robert L. Trenchard
Watson, Cole, Grindle & Watson
ATTORNEYS

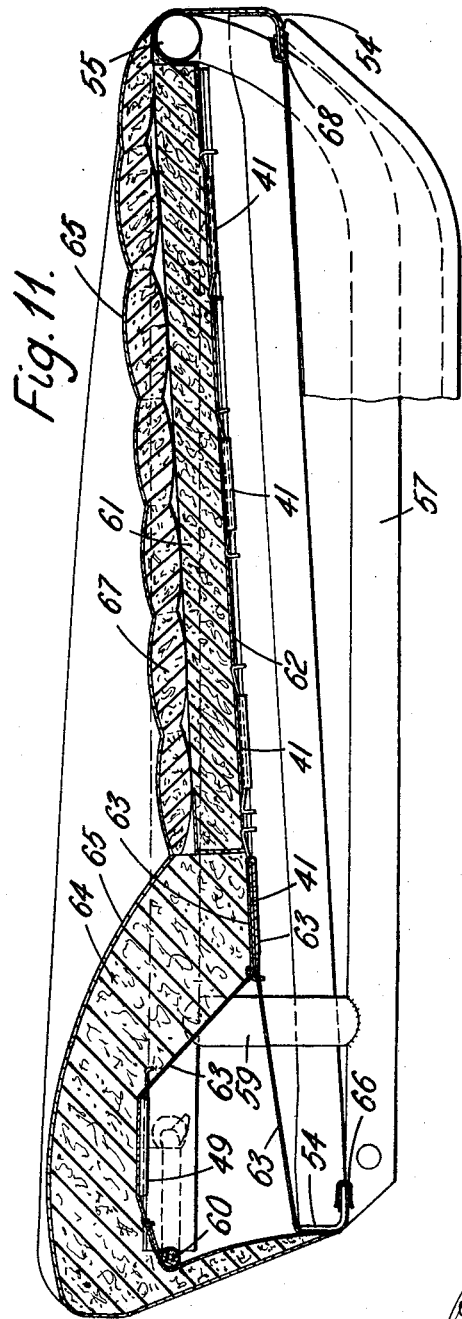

May 7, 1963  D. L. HORROCKS ETAL  3,088,773
SEATS, CHAIRS, CHAIRBACKS AND THE LIKE
Filed May 31, 1961

INVENTORS
David L. Horrocks
Robert G. Trenchard

Watson, Cole, Grindle & Watson
ATTORNEYS

United States Patent Office 3,088,773
Patented May 7, 1963

3,088,773
SEATS, CHAIRS, CHAIRBACKS AND THE LIKE
David Leslie Horrocks, Sidcup, and Robert George Trenchard, Harold Wood, England, assignors to Microcell Limited, London, England, a British company
Filed May 31, 1961, Ser. No. 113,779
Claims priority, application Great Britain June 2, 1960
22 Claims. (Cl. 297—445)

This invention relates to seats, chairs, chairbacks and the like.

The invention provides, a base for supporting upholstery padding for a seat, chair, chairback or the like, in which a flexible supporting surface, e.g. of sheet or strip form, extends between anchorages and is connected, intermediate in its length or width, by flexible ties to anchorages spaced from the said anchorages of the supporting surface, whereby its shape is at least partly controlled.

Preferably the flexible supporting surface comprises a central portion and side margins and opposite side margins of the flexible supporting surface each form with a flexible tie (or set of such ties distributed along the length of the margin) two sides of a triangle, the anchorages for the supporting surface and for the tie or ties being provided at the ends of the third side.

The flexible supporting surface may comprise one or more sheets of flexible material or (or and) one or more sets of flexible strips and may include stiffeners.

The ties are preferably of substantially non-extensible material e.g. woven nylon fabric, and the margins and/or the part of the supporting surface between the margins i.e. the central portion may also be of such material. It is preferred that the ties and the margins are of substantially non-extensible material and the central portion is of resiliently extensible material. In such a case the central portion may comprise a set of resiliently extensible elongated members, and the side margins may have stiffeners to which the resiliently extensible elongated members are attached.

The lengths of the ties or the widths of the margins or both the lengths of the ties and the widths of the margins (i.e. the lengths of one or both sides of the said triangles) may vary along the direction of the lengths of the margins.

The anchorages of the ties may comprise two opposite sides of a rigid frame. Similarly the anchorages for the supporting surface may comprise two opposite sides of a rigid frame.

The invention includes an upholstered article comprising a base as aforesaid supporting padding and covering material therefor.

Some specific constructions embodying the invention will now be described by way of example with reference to FIGURES 1 to 7 filed with the provisional specification and to FIGURES 8 to 12 filed herewith.

FIGURE 1 illustrates the base of a chair for use as a car seat,

FIGURE 2 is a diagrammaitc sectional view of a modified base on the line corresponding to the line II—II of FIGURE 1, FIGURE 3 is a similar sectional view of the chair, after the upholstery padding and covers have been attached to the base, FIGURES 4 and 5 are sectional views similar to FIGURE 2, of other bases for car seats, FIGURE 6 is a diagrammatic sectional view similar to FIGURE 2 with a load placed centrally on the base, FIGURE 7 is a sectional view similar to FIGURE 6, showing the load displaced to one side of the base.

Referring now to FIGURES 1 and 2, the base for supporting upholstery padding for the seat of the chair comprises a flexible supporting surface 1 extending between anchorages 2, and connected intermediate in its width by flexible ties 3 to anchorages 4 spaced from the anchorages 2 of the supporting surface. The ties 3 hold the flexible supporting surface 1 to shape.

The supporting surface 1 comprises extensible strips 5, e.g. rubber strips, attached to a frame made from metal stiffeners 6 and 7, and strips 8. The strips 8 and the ties 3 are made of substantially non-extensible material e.g. woven nylon fabric. It will be seen (FIGURE 2) that the opposite side margins of the flexible supporting surface (i.e. the strips 8) form with flexible ties 3, two sides of a triangle, the anchorages for the supporting surface and for the ties being provided at the ends of the third side.

The lengths of the ties 3 and the widths of the margins 8 vary along the direction of the lengths of the margins, hence the seat base slopes downward towards the back.

For the back of the chair the same method of supporting the upholstery padding is used. The flexible supporting surface 9, a sheet of substantially non-extensible material e.g. woven nylon fabric, includes stiffeners 10, extends between anchorages 11 and is connected intermediate in its width by two flexible ties 12, each consisting of a sheet of woven nylon fabric to anchorages 13, spaced from the anchorages 11 of the supporting surface. The ties 12 hold the flexible supporting surface 9 to shape.

Opposite side margins 14 of the supporting surface 9 each form with a flexible tie 12 two sides of a triangle, the anchorages for the supporting surface and for the ties being provided at the ends of third side.

The lengths of the ties 12 and the widths of side margins 14 vary along the direction of the lengths of the margins so that a curved chair back is obtained.

The supporting surfaces 1 and 9, and the ties 3 and 12 are secured by adhesive to metal tubes e.g. steel tubes which form part of a rigid frame for the chair, thus providing the anchorages 2, 11, 4 and 13.

Shaping or profiling of the chairback is achieved by pulling the sheet round the metal tubes until the desired shape is obtained and then securing the sheets to the metal tubes by adhesive.

One form of upholstery padding is shown in FIGURE 3. Latex foam squabs 15, 16, 17 are stuck to the shaped base and fitted with upholstery covers 18, which may be tightened by adjusting the ties 3. The upholstery padding and covers may be fixed to the back of the chair in a similar way. Shaping of the chair is obtained largely by means of the base.

Any suitable upholstery padding may be used, resilient foam material being particularly suitable.

The supporting surface and the ties may be secured to other forms of rigid frame e.g. as shown in cross section in FIGURES 4 and 5.

FIGURE 4 shows a supporting surface 21 having side margins 22 and 23 and ties 24 and 25 secured to a rigid frame 26, the top and bottom of the frame providing anchorages for the supporting surface and ties respectively. FIGURE 5 shows a similar view in which the supporting surface and ties are anchored to a rigid frame 27 of different cross section from that of FIGURE 4.

The chairs of these examples are intended for sports cars. Profiling of the seat reduces the tendency of the occupant to slide sideways during cornering at high speeds. FIGURE 6 shows the base with the load placed normally, both the flexible ties 19 and 20 being slack. FIGURE 7 shows the load displaced to one side. The displaced load has the effect of deepening one side of the base, the tie 20 becoming slacker, and throwing the other side upwards, the latter effect being reduced by the tie 19 which becomes taut.

FIGURES 8 to 12 of the accompanying drawings illustrate a chair for use as a car seat having a seat base constructed in accordance with the invention.

FIGURE 8 is a part plan view of the seat base before the upholstery is fitted;

FIGURE 9 is a diagrammatic sectional view on the line IX—IX of FIGURE 8 extending for the whole width of the seat base;

FIGURE 10 is front view of the upholstered seat bases with part of the upholstery cut away;

FIGURE 11 is a part view of the upholstered seat base from the section line XI—XI of FIGURE 10.

Figure 1:
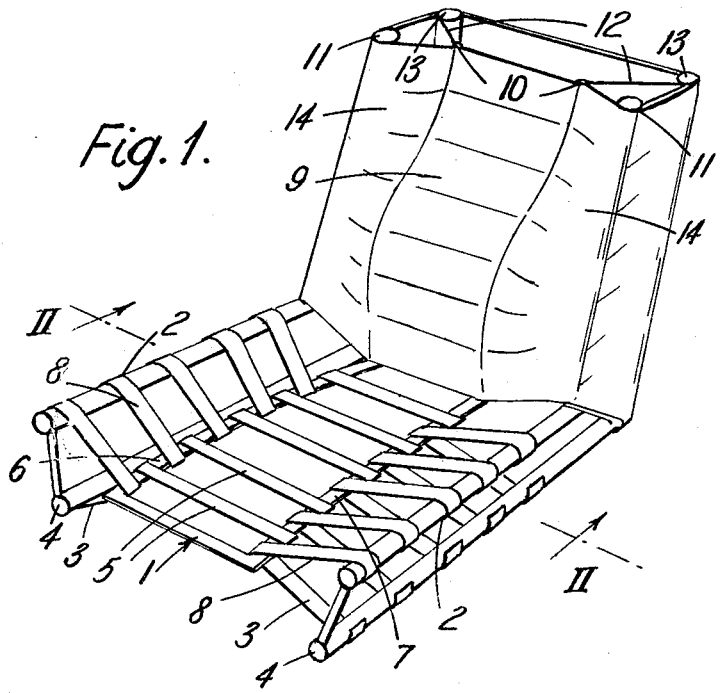
Figure 2:
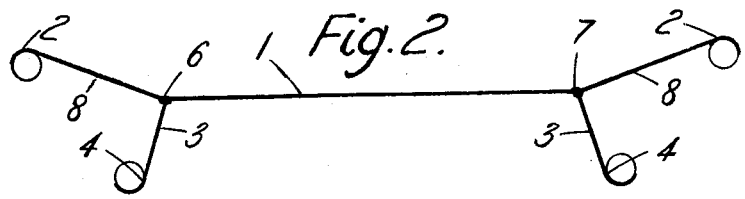
Figure 3:
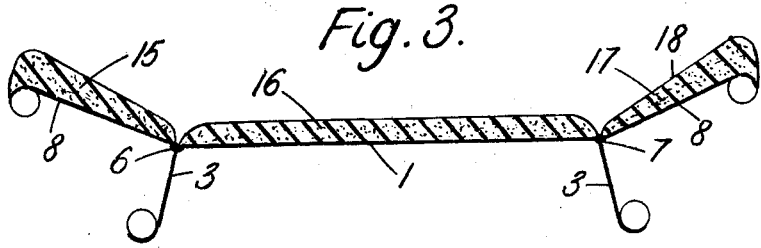
Figure 4:
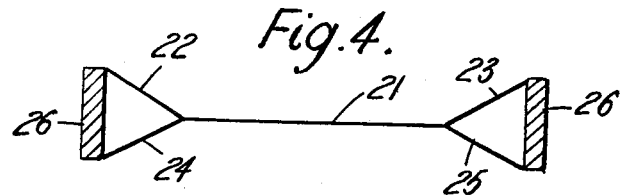
Figure 5:
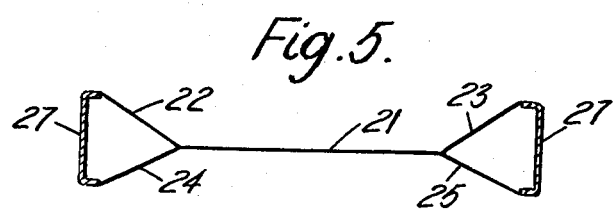
Figure 6:
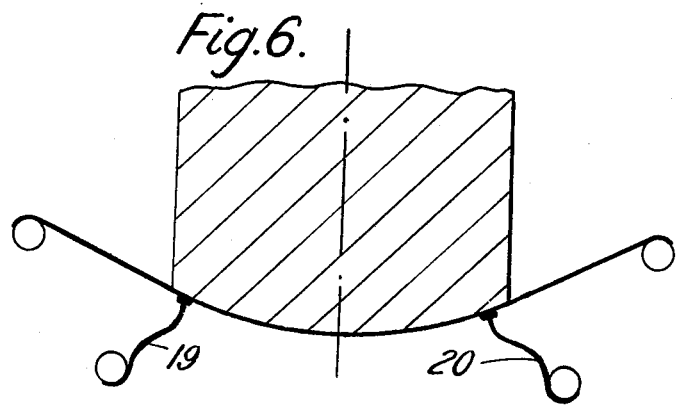
Figure 7:
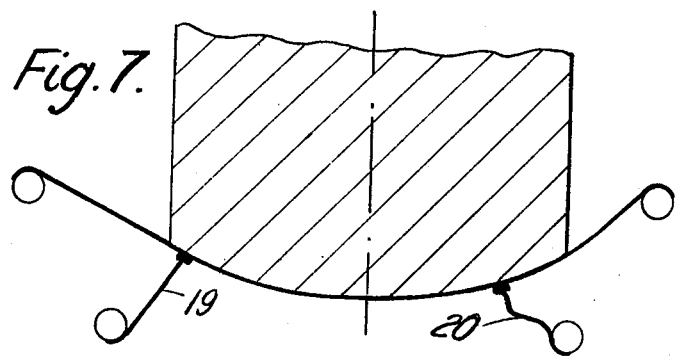

Referring now to FIGURES 8, 9, 10 and 11, the base for supporting upholstery padding for the seat of the chair comprises a flexible supporting surface comprising a central portion formed of a set of 4 flexible resiliently extensible strips 41 made of reinforced rubber and attached to metal stiffeners 42 and 43 by metal wire hooks 44 which pass through holes in the stiffeners and side margins, 45 and 46, formed of substantially non-extensible woven sheet material. The stiffeners 42 and 43 are stitched into pockets in the side margins 45 and 46 respectively. The supporting surface extends between tubular steel anchorages 47 and 48 to which the side margins are attached by adhesive. It will be seen (FIGURE 8) that the side margins 45 and 46 (not shown) do not extend for the full length of the seat base the supporting surface including a resiliently extensible strip 49 made of reinforced rubber which is positioned at the front of the base and which extends between the anchorages 47 and 48 to which it is secured by metal hooks similar to the hooks 44.

The supporting surface is connected intermediate in its width by flexible ties 50 and 51 to anchorages 52 and 53 spaced from the anchorages 47 and 48 of the supporting surface. The ties 50 and 51 hold the flexible supporting surface to shape and it will be seen (FIGURE 9) that opposite side margins 45 and 46 of the flexible supporting surface form width flexible ties 50 and 51, two sides of a triangle, the anchorages for the supporting surface and for the ties being provided at the ends of the third side. The anchorages 52 and 53 are two opposite sides of a rectangular metal frame 54 which defines the area of the bottom of the base. In this embodiment the tie 50 and side margin 45 are formed from a single piece of woven material (duck), as are the tie 51 and side margin 46. The tubular steel anchorages 47 and 48 are welded to a tubular steel, cross piece 55, to which are welded curved tubular steel runners 56 and 57 by which the base may be attached to the floor of a car. The front runners 57 (FIGURE 11) (and similarly runner 56, FIGURE 8) is attached (by welding) to the metal frame 54 at the front and back of the frame. Tubular steel stays 58 (FIGURE 8) and 59 (FIGURE 11) connect the anchorages 47 and 48 to the runners 56 and 57, to form a rigid structure. A bungee cord 60 (FIGURES 8 and 11) extends across the front of the seat base.

Referring now to FIGURES 10 and 11 which show the upholstery padding in position, a latex foam squab 61 partly covered with duck material 62 which is secured by adhesive to the cross-piece 55, is placed upon 3 of the 4 strips 41.

The remaining strip 41 and the strip 49 are covered with a sheet of woven duck material 63 which passes round the strip 41 so that the strip is contained in a pocket in the material and over the strip 49 and cord 60 and is secured by adhesive to the frame 54. A shaped latex foam squab 64 rests on the sheet 63 and is covered with upholstery covering material 65 (in this example vynide). The material 65 also covers a polyester foam squab 67 which rests upon the squab 61, and which has flutes produced by stitching the covering material 65 to it. The covering material 65 is secured by clips 66 and 68 to the frame 54 the clips being evenly spaced along the ends of the frame. Piping cord 69 is sewn into the edges of the covering 65.

The side margins 45 and 46 are padded with latex foam bolsters 70 and 71 which extend from front to back of the seat base. These bolsters are also covered with vynide upholstery covering 72 and 73 which is fastened by clips or stitching to the margins 45 and 46 and by clips to the sides 52 and 53 of the frame 54. Piping cord 74 and 75 is stitched into the edges of the covering.

Figure 12:
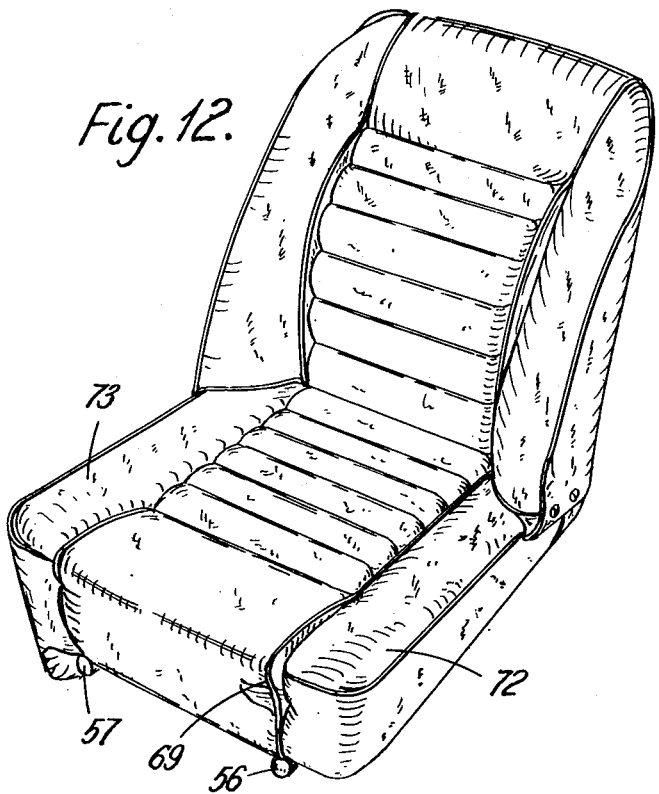
FIGURE 12 is a perspective view of the upholstered seat base, illustrated in FIGURES 8 to 11 fitted with a conventional back.

In this example the upholstered seat base has a conventional back as shown in FIGURE 12. The back has a rigid curved base and is upholstered with latex foam squabs covered with vynide upholstery covering material. It will be appreciated that chairbacks other than that illustrated in FIGURE 12 may be used with the seat base illustrated in FIGURES 8 to 11.

Figure 13:
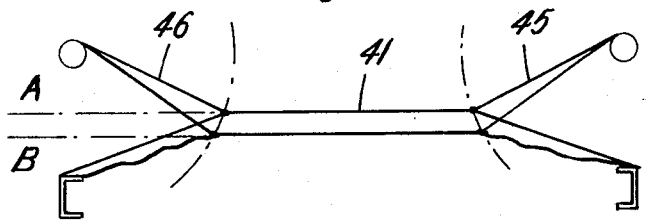

In the embodiment shown in FIGURES 8 to 12, the application of a load to the seat base results in extension of the strips 41 and consequent deepening of the seat. The construction is such that the strips tend to extend lengthwise, the edges of the side margins moving in an arc about their respective anchorages. This effect is illustrated in FIGURE 13 of the accompanying drawings which is a diagrammatic vertical cross section through the seat base. When a load is placed on the supporting surface the strip 41 moves from position A to position B. Since the side margins 45 and 46 are of non-extensible material they move in an arc about their respective anchorages and hence the strip 41 is extended lengthwise when in position B.

It is to be understood that the invention is not limited to the details of the foregoing examples of specific constructions.

We claim:

1. A base for supporting upholstery padding for a seat, chair, chairback and the like, in which a flexible supporting surface extends between anchorages and is connected, intermediate in its width, by flexible ties of fixed length to anchorages spaced in a different plane from the said anchorages of the supporting surface, whereby its shape is at least partly controlled.

2. A base as claimed in claim 1, wherein the supporting surface is of sheet form.

3. A base as claimed in claim 1, wherein the flexible supporting surface comprises at least one sheet of flexible material.

4. A base as claimed in claim 1, wherein the anchorages for the ties are two opposite sides of a rigid frame.

5. A base as claimed in claim 4, wherein the anchorages for the supporting surface are two opposite sides of a rigid frame.

6. An upholstered article comprising a base as claimed in claim 5 supporting padding and covering material therefor.

7. A base as claimed in claim 1, wherein the supporting surface is of strip form.

8. A base for supporting upholstery padding for a seat, chair, chairback and the like, in which a flexible supporting surface comprising a central portion and side margins, extends between anchorages and is connected, intermediate in its width, by flexible ties to anchorages spaced in a different plane from the said anchorages of the supporting surface whereby the shape of the supporting surface is at least partly controlled, and opposite side margins of the supporting surface each form with a flexible tie, two sides of a triangle, the anchorages for the supporting surface and for the tie being provided at the ends of the third side.

9. A base as claimed in claim 8, wherein stiffeners are included in the supporting surface, said stiffeners defining the central portion.

10. A base as claimed in claim 8, wherein the ties and the margins are of substantially non-extensible material and the central portion is of resiliently extensible material.

11. A base as claimed in claim 10, wherein the non-extensible material is woven sheet material.

12. A base as claimed in claim 10, wherein the central portion of the supporting surface comprises a set of resiliently extensible elongated members.

13. A base as claimed in claim 12, wherein the side margins have stiffeners to which the resiliently extensible elongated members are attached.

14. A base as claimed in claim 8, wherein the lengths of the ties vary along the direction of the lengths of the margins.

15. A base as claimed in claim 14, wherein both the lengths of the ties and the widths of the margins vary along the direction of the lengths of the margins.

16. A base as claimed in claim 8, wherein the widths of the margins vary along the direction of the lengths of the margins.

17. An upholstered article comprising a base as claimed in claim 8, supporting padding and covering material therefor.

18. A base for supporting upholstery padding for a seat, chair, chairback and the like in which a flexible supporting surface comprising a central portion and side margins, extends between anchorages and is connected intermediate in its width by a set of flexible ties distributed along the length of each of the margins, to anchorages spaced in a different plane from the said anchorages of the supporting surface whereby the shape of the supporting surface is at least partly controlled and opposite side margins of the supporting surface each form with a set of flexible ties distributed along the length of the margin two sides of a triangle, the anchorages for the supporting surface and for the tie being provided at the ends of the third side.

19. A base as claimed in claim 18, wherein the supporting surface comprises at least one set of flexible strips.

20. An upholstered article comprising a base as claimed in claim 18, supporting padding and covering material therefor.

21. A base for supporting upholstery padding for a seat, chair, chairback and the like, in which a flexible supporting surface, extends between anchorages and is connected, intermediate in its length, by flexible ties of fixed length to anchorages spaced in a different plane from the said anchorages of the supporting surface, whereby its shape is at least partly controlled.

22. A base for supporting upholstery padding for a seat, chair, chairback and the like, in which a flexible supporting surface extends between anchorages and is connected both intermediate its width and its length, by flexible ties to anchorages spaced in a different plane from the said anchorages of the supporting surface, whereby its shape is at least partly controlled.

References Cited in the file of this patent
UNITED STATES PATENTS

| | | |
|---|---|---|
| 1,376,641 | Roever | May 3, 1921 |
| 2,115,258 | Ferreira et al. | Apr. 26, 1938 |
| 2,231,346 | Riesing et al. | Feb. 11, 1941 |
| 2,824,602 | Collins et al. | Feb. 25, 1958 |